(12) United States Patent
Ware

(10) Patent No.: US 11,782,788 B2
(45) Date of Patent: *Oct. 10, 2023

(54) ERROR-CORRECTION-DETECTION CODING FOR HYBRID MEMORY MODULE

(71) Applicant: Rambus Inc., San Jose, CA (US)

(72) Inventor: Frederick A. Ware, Los Altos Hills, CA (US)

(73) Assignee: Rambus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/585,654

(22) Filed: Jan. 27, 2022

(65) Prior Publication Data

US 2022/0214940 A1 Jul. 7, 2022

Related U.S. Application Data

(63) Continuation of application No. 16/768,722, filed as application No. PCT/US2018/063436 on Nov. 30, 2018, now Pat. No. 11,249,845.

(60) Provisional application No. 62/595,403, filed on Dec. 6, 2017.

(51) Int. Cl.
| | |
|---|---|
| G11C 29/00 | (2006.01) |
| G06F 12/0882 | (2016.01) |
| G06F 11/10 | (2006.01) |
| G06F 11/07 | (2006.01) |
| G06F 11/30 | (2006.01) |
| G06F 12/02 | (2006.01) |

(52) U.S. Cl.
CPC ...... *G06F 11/1068* (2013.01); *G06F 11/0772* (2013.01); *G06F 11/3037* (2013.01); *G06F 12/0246* (2013.01); *G06F 12/0882* (2013.01); *G06F 2212/7201* (2013.01)

(58) Field of Classification Search
CPC ............ G06F 11/1068; G06F 11/0772; G06F 11/3037; G06F 12/0246; G06F 12/0882; G06F 2212/7201
See application file for complete search history.

(56) References Cited

U.S. PATENT DOCUMENTS

| | | | |
|---|---|---|---|
| 6,728,913 | B1 | 4/2004 | Parker |
| 6,988,175 | B2 | 1/2006 | Lasser |
| 7,589,999 | B2 | 9/2009 | Jeong et al. |

(Continued)

OTHER PUBLICATIONS

International Preliminary Report on Patentability dated Jun. 9, 2020 re: Int'l Appln. No. PCT/US2018/063436. 4 pages.

(Continued)

*Primary Examiner* — Christine T. Tu
(74) *Attorney, Agent, or Firm* — Silicon Edge Law Group LLP; Arthur J. Behiel

(57) ABSTRACT

A hybrid volatile/non-volatile memory employs a relatively fast, durable, and expensive dynamic, random-access memory (DRAM) cache to store a subset of data from a larger amount of relatively slow and inexpensive nonvolatile memory (NVM). The memory supports error-detection and correction (EDC) techniques by allocating a fraction of DRAM storage to information calculated for each unit of stored data that can be used to detect and correct errors. An interface between the DRAM cache and NVM executes a wear-leveling scheme that aggregates and distributes NVM data and EDC write operations in a manner that prolongs service life.

19 Claims, 8 Drawing Sheets

(56) References Cited

U.S. PATENT DOCUMENTS

| | | |
|---|---|---|
| 7,657,795 B2 | 2/2010 | Fischer |
| 8,176,235 B2 | 5/2012 | Franceschini et al. |
| 8,281,063 B2 | 10/2012 | Yu et al. |
| 8,614,913 B2 | 12/2013 | Yoon et al. |
| 8,626,991 B1 | 1/2014 | Beauchamp |
| 8,711,610 B2 | 4/2014 | Seo et al. |
| 9,569,308 B1 | 2/2017 | Ware et al. |
| 9,575,686 B2 | 2/2017 | Wu et al. |
| 9,620,227 B1 | 4/2017 | Battaje et al. |
| 9,740,439 B2 * | 8/2017 | Franceschini ......... G06F 3/0619 |
| 2003/0179624 A1 | 9/2003 | Roohparvar et al. |
| 2006/0259718 A1 | 11/2006 | Paley |
| 2009/0228739 A1 | 9/2009 | Cohen et al. |
| 2009/0287893 A1 | 11/2009 | Cheng et al. |
| 2012/0317340 A1 | 12/2012 | So et al. |
| 2015/0082119 A1 | 3/2015 | Ware et al. |
| 2015/0234706 A1 | 8/2015 | Alrod et al. |
| 2016/0034346 A1 | 2/2016 | Michael |
| 2016/0170871 A1 | 6/2016 | Hyun et al. |
| 2017/0160932 A1 * | 6/2017 | Thakkar .............. G06F 11/1068 |
| 2022/0075687 A1 * | 3/2022 | Jain .................... G06F 11/1068 |

OTHER PUBLICATIONS

Notification of Transmittal of the International Search Report and the Written Opinion of the International Searching Authority, or the Declaration dated Feb. 12, 2019 re: Int'l Appln. No. PCT/US2018/063436. 12 Pages.

Yaakobi et al., "Error Characterization and Coding Schemes for Flash Memories", In: 2010 IEEE GLOBECOM Workshops (CC Wkshps), Jan. 24, 2011 (Jan. 24, 2011) Retrieved from <http://citeseerx.ist.psu.edu/viewdoc/download?doe=10.1.1.174.6500&rep-rep1&type-pdf>, entire document. 6 Pages.

\* cited by examiner

ERROR-CORRECTION-DETECTION CODING FOR HYBRID MEMORY MODULE

FIELD OF THE INVENTION

The disclosed embodiments relate generally to memory systems, components, and methods.

BRIEF DESCRIPTION OF THE DRAWINGS

The detailed description is illustrated by way of example, and not by way of limitation, in the figures of the accompanying drawings and in which like reference numerals refer to similar elements and in which:

FIG. 2 depicts a memory system 200 similar to system 100 of FIG. 1, with like-identified elements being the same or similar.

DETAILED DESCRIPTION

Figure 1:
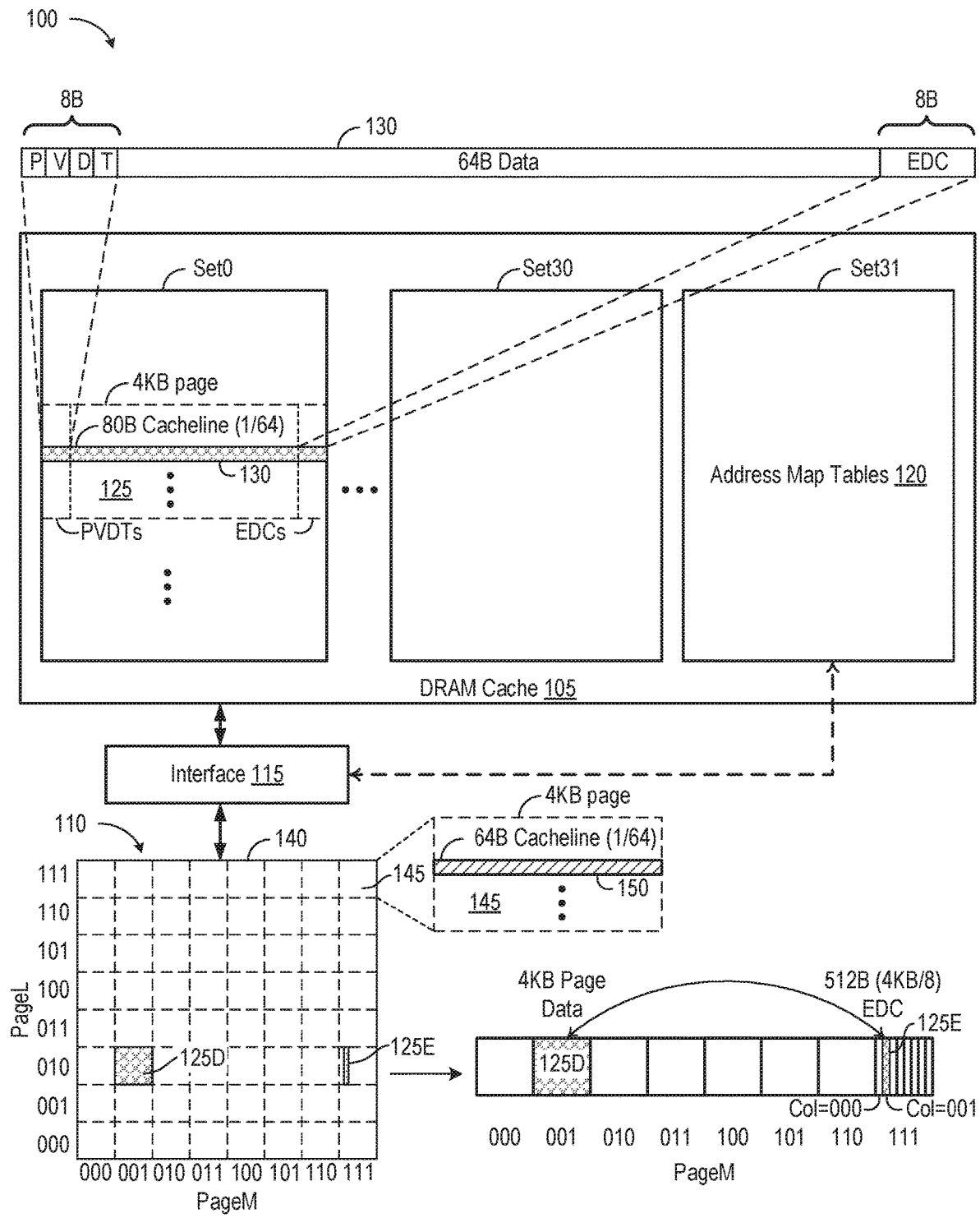
FIG. 1 depicts a hybrid volatile/non-volatile memory 100 that employs a relatively fast, durable, and expensive dynamic, random-access memory (DRAM) cache 105 to store a subset of data from a larger amount of relatively slow and inexpensive nonvolatile memory (NVM) 110.

FIG. 1 depicts a hybrid volatile/non-volatile memory 100 that employs a relatively fast, durable, and expensive dynamic, random-access memory (DRAM) cache 105 to store a subset of data from a larger amount of relatively slow and inexpensive nonvolatile memory (NVM) 110. DRAM can be sensitive to "soft errors" due to e.g. electrical or magnetic interference. Memory 100 thus supports error-detection and correction (EDC) techniques by allocating a fraction of DRAM storage to "syndromes," information calculated for each unit of stored data that can be used to detect and correct errors. NVM is generally less sensitive to soft errors than is volatile memory and is consequently organized in a fashion that is not optimized to store the syndromes used for EDC. An interface 115 between cache 105 and NVM 110 maps and stores cached data and EDC bits to address this discordancy. NVM 110 has poor endurance relative to DRAM, which is to say that NVM offers a limited number of program (write) and erase operations before becoming unreliable. A hardware interface 115 executes a "wear leveling" scheme that distributes write operations relatively evenly across NVM 110 to prolong service life. Memory 100 combines the nonvolatility, error-tolerance, and reduced per-bit price of nonvolatile memory with the speed and durability of DRAM.

Memory 100 serves as physical memory in support of a computer operating system that, using a combination of hardware and software, maps memory addresses used by a program, called virtual addresses, into physical addresses of memory 100. Virtual address space is commonly divided into 4 KB (4096 b) virtual pages, which are blocks of contiguous virtual memory addresses. Physical address space in memory 100 is likewise divided into 4 KB pages, and both NVM and DRAM devices can have rows and columns of memory cells organized such that each row stores a "page" of data. The operating system maintains a page table that stores a mapping between virtual and physical addresses. The concept of virtual memory is well known to those of skill in the art so a detailed treatment is omitted.

DRAM cache 105 and NVM 110 are each divided into 4 KB physical pages in support of the 4 KB virtual pages of the operating system. Cache 105 is logically divided into thirty-two ($2^5$) sets Set[31:0] of 524 KB ($2^{19}$) 4 KB ($2^{12}$) pages 125. Each page 125 includes sixty-four ($2^6$) eighty-byte (80 B) cache lines 130. Each cache line 130 includes five fields: a one-bit parity-bit field P to store a parity bit; a valid-bit field V, a dirty-bit field D, a five-bit cache-tag field T; a 64 B data field to store cached data; and an eight-bit EDC field to store EDC bits-syndromes-associated with the cached data.

NVM 110, flash memory in this embodiment, offers sixteen times the data storage of cache 105, which allows the host to specify $2^{40}$ individual data bytes (1 TB). NVM 110 is divided into 1M ($2^{20}$) erase blocks 140, only one of which is depicted here. Each erase block 140 includes an eight-by-eight array of NVM pages 145, each with 256 ($2^8$) 64 B cache lines 150. The six NVM byte-address bits are not used. NVM 110 may include one or more of single-level-cell or multi-level-cell flash memory, phase-change memory, magneto-resistive RAM, ferroelectric RAM, Nano-RAM, and a proprietary memory available from Intel Corporation under the trademark 3D XPOINT.

Any 4 KB page 145 in NVM 110 can have a corresponding 4 KB page 125 in cache 105. Pages 125 store 80 B cache lines vs. the 64 B NVM cache lines 150, however, so one NVM page 145 cannot accommodate the contents of one volatile page 125. Fields P, V, D, and T are not stored in NVM 110. EDC syndromes are stored in NMV 110 in this embodiment, however, so memory 100 stores the contents of each DRAM page 125 across two NVM pages 145. This example shows data and EDC bits from a single DRAM cache page 125—64×64 B of data 125D and 64×8 B of EDC 125E—divided across two of eight NVM pages 145 in one row (PageL=010) of NVM pages of a single erase block 140. The first seven columns of pages 145 (page-address bits PageM=000-110) are allocated for data and the last column of pages (PageM=111) is divided into eight sub-pages, columns Col, the first seven of which are allocated for EDC. Column address Col equals page address PageM in this embodiment. The illustrated page 125D at PageM=001 therefore has corresponding EDC bits at PageM=111 and Col=001. The highest address Col=111 of address PageM=111 is reserved. Physical addresses in which the three most-significant bits are 111, and thus field PageM=111, are not available to a requesting host (e.g., a memory controller) with access to memory 100.

In another embodiment (not shown), the data 125D and set of EDC syndromes 125E for each cached page 125 is stored across contiguous space in NVM 110. A row of eight NVM pages 145 is divided into 64 columns. Each page 125 maps to adjacent nine columns. The leftmost page at PageM=000 thus "borrows" a column to the right to overlap PageM=001 by one column, the next page overlaps the next by two columns, etc., so that seven pages extend over all but the eighth column address of the NVM page at address PageM=111.

Figure 2:
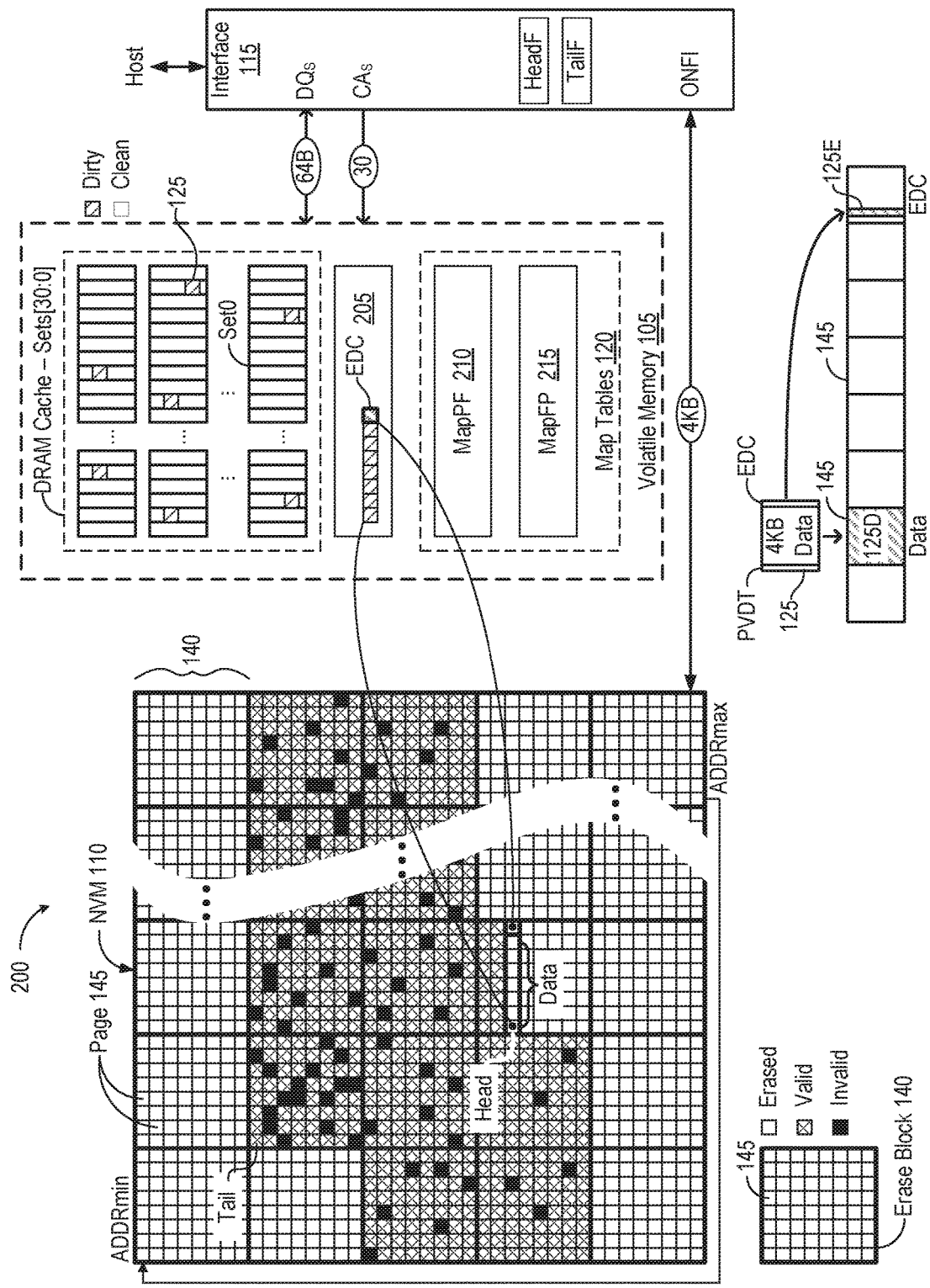

FIG. 2 depicts a memory system 200 similar to system 100 of FIG. 1, with like-identified elements being the same or similar. NVM 110 is divided up into groups of nonvolatile erase blocks (erase units) 140 and NVM pages (access units) 145. Volatile memory 105 includes thirty-one sets Set[30:0] of DRAM cache, address map tables 120, and write-back aggregation memory 205. Tables 120 includes a mapPF table 210 that maintains a mapping between physical addresses and NVM addresses for NVM pages 145; and a MapFP/ValidF table 215 that maintains a mapping between NVM addresses and physical addresses and identifies valid and invalid page entries in NVM 110.

Interface 115 includes two registers that keep track of the amount of available erased pages in NVM 110: a head register HeadF contains the address of the next empty one of NVM pages 145 to receive data writes, and a tail register TailF contains the address of the one of erase units 140 storing the eldest data. The erase unit with the eldest data is likely to be among the erase units with the highest number of invalid page entries. Erasing the erase unit with the eldest data is therefore likely to free up a relatively large number of nonvolatile access units for future writes. Interface 115 communicates with the other components of memory system 200 over a number of ports, descriptions of some of those ports are provided below in connection with later figures.

Reads and writes to NVM 110 may be performed one 4 KB page at a time, in a random-access fashion, but erasures are carried out on erase blocks 140. Each page 145 within an erased erase unit 130 can be written to or read from. Once written to, however, a page 145 cannot be written to again until the entire erase block 140 is erased. Cache sets Set[30:0], at the direction of interface 115, cache data and related information as noted previously, while tables 120 keep track of which virtual pages reside in memory 200 and whether those pages have been written to without the changes having yet been saved to a lower level in the memory hierarchy (i.e., are dirty). Virtual-to-physical and physical-to-virtual address translation tables (not shown) may be held in secondary memory, and may be moved to memory system 200 by paging software (also not shown). These and other details that relate to the use of virtual memory are well understood by those of skill in the art and are therefore omitted for brevity.

Interface 115 tracks dirty pages 125—shaded—in DRAM cache sets Set[30:0]. Dirty pages are those that include changes not reflected in corresponding memory locations within NVM 110. Interface also uses map tables 120 to store maps 210 and 215 of physical-to-flash (P→F) and flash-to-physical (F→P) address translations identifying where data in sets Set[30:0] have corresponding pages in NVM 110 and vice versa. With reference to the key in the lower left of FIG. 2, NVM pages 145 can be erased or can contain information that is either valid or invalid. These distinctions are described below.

As noted in connection with FIG. 1, interface 115 accesses (reads or writes) 80 B cache lines in volatile memory 105 and stores 718$^{th}$ of this information (64 B data and 8 B EDC for each cache line of each page) in a pair of related NVM pages 145. The first seven pages 145 of each row of NVM pages stores 64×64 B data and the last page 145 of the row is divided into eight columns, the first seven of which store 64×8 B EDC for a corresponding data page. A row of eight pages 145 thus stores data and EDC bits for seven volatile pages 125. Because the contents of the last page of each NVM row is a function of seven other pages 125, that last page much be overwritten each time one of the other seven is overwritten. System 200 limits the number of such writes, and consequently the number of erasures and concomitant wear, by aggregating rows of seven dirty pages in memory 205 before initiating a write to NVM 110. A row of eight NVM pages 145 is therefore updated together rather than separately to dramatically reduce the requisite number of NVM writes and correspondingly prolong service life.

Figure 3:
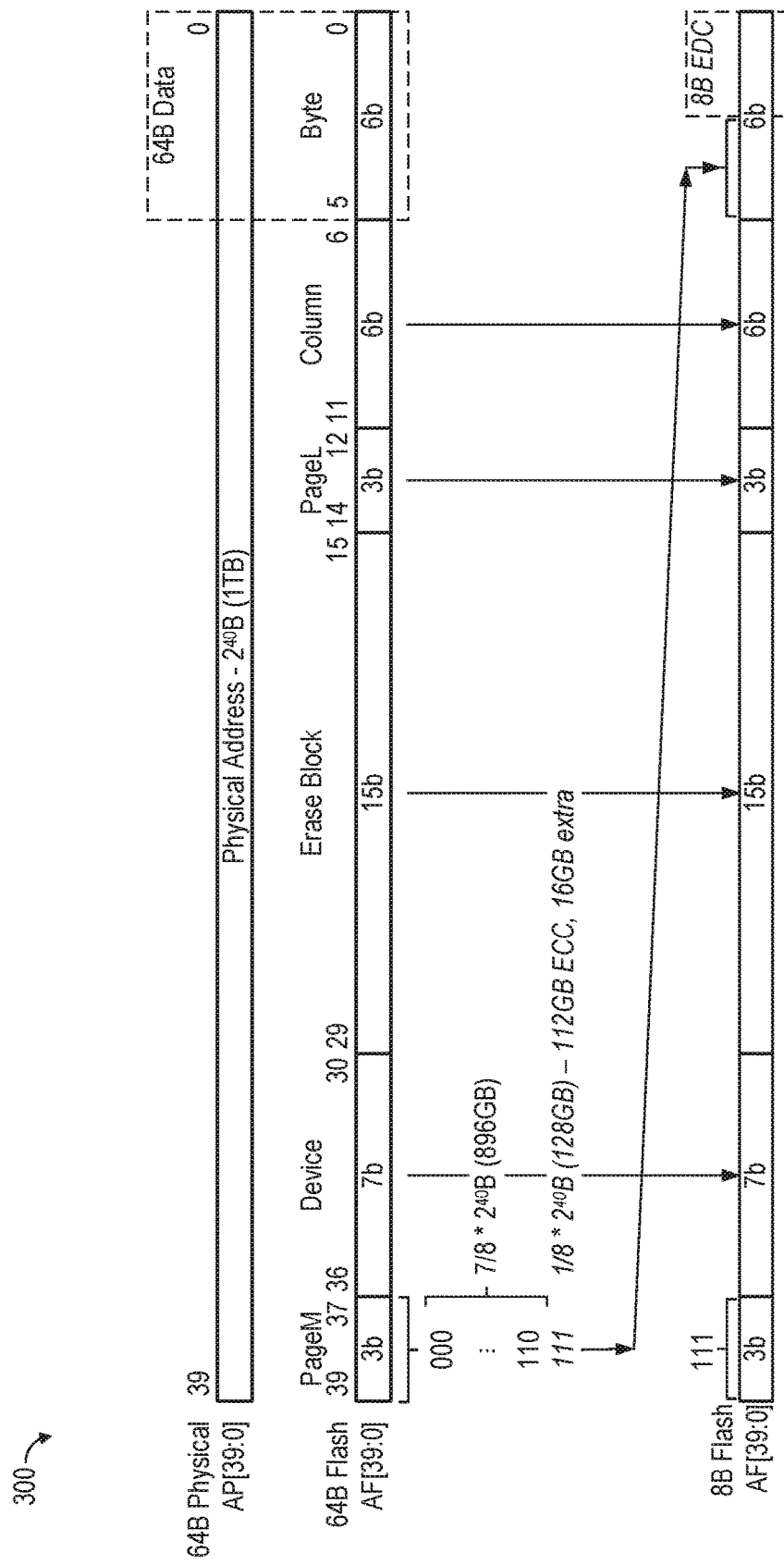
FIG. 3 illustrates how interface 115 of FIG. 2 maps a forty-bit physical address AP[39:0] to a pair of NVM addresses AF[39:0], a first NVM address directed to a 64 B cache line within a first NVM page 145 in a row of NVM pages and a second NVM address directed to a column within a second NVM page 145 in the same row.

FIG. 3 illustrates how interface 115 of FIG. 2 maps a forty-bit physical address AP[39:0] to a pair of NVM addresses AF[39:0], a first NVM address directed to a 64 B cache line within a first NVM page 145 in a row of NVM pages and a second NVM address directed to a column within a second NVM page 145 in the same row.

In this example, the memory system provides access to 1 TB of memory space addressable via forty-bit physical addresses AP[39:0] ($2^{40}$ B=1 TB). A requesting host (e.g., a memory controller) is configured to perceive memory system 200 as providing 896 GB, or seven-eighths of the addressable space. (In this context, "addressable space" refers to memory available to the host and for EDC, and is distinct from redundant memory resources and related repair circuitry included for wear leveling and to compensate for defective resources). From the host perspective, the three most-significant bits AP[39:37] of the physical address are limited to 110 b. The remaining ⅛$^{th}$ of the useable capacity—addressable using MSBs of 111 b—is available to interface 115 for EDC storage. Interface 115 can be configured to send an error message responsive to external memory requests that specify a physical address in which bits AP[39:37] are 111 b.

Interface 115 places a field PageM for three of the page address bits and a field Device for at least one of the device address bits at the high-order end of physical address AP[39:0], the most-significant bits in this example, and translates physical addresses AP[39:0] bitwise to NVM addresses AF[39:0]. High-order field PageM designates one NVM page 145 of a row of contiguous pages in the manner detailed in connection with FIG. 2. Device field Device designates a flash chip, or die, in which page 145 resides. Interface 115 also maps the three most-significant bits AF[39:37] of the NVM address to the three low-order bits that specify a byte within the last NVM page 145 in the same row of pages. A single physical address AP[39:0] is thus mapped to two NVM pages 145 in the same row of pages. The addressed data block thus straddles those two pages. High-order and low-order bits are those in the most-significant and least-significant halves, respectively.

Figure 4:
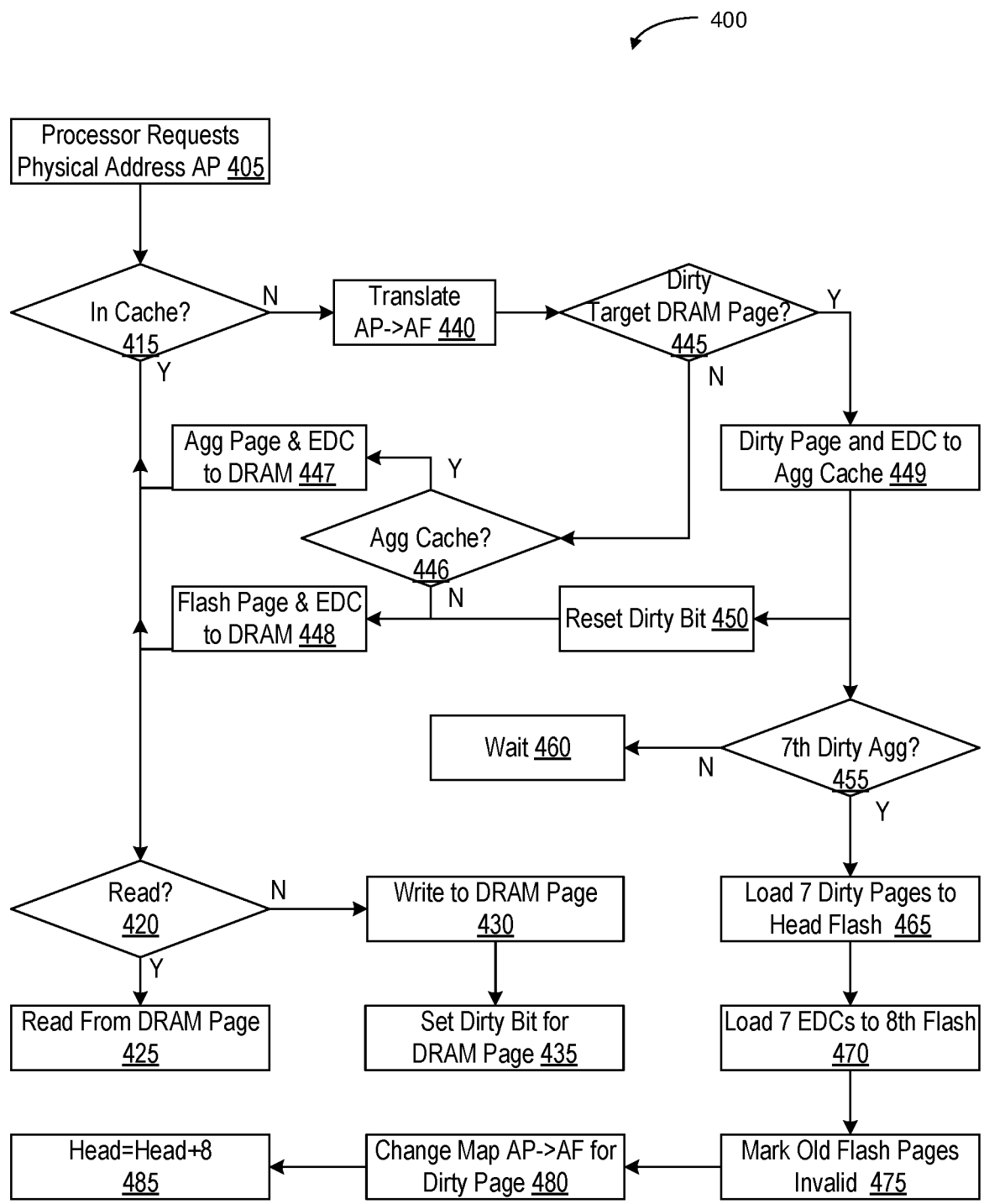
FIG. 4 is a flowchart 400 depicting the operation of portions of memory system 200 of FIG. 2 in accordance with one embodiment.

FIG. 4 is a flowchart 400 depicting the operation of portions of memory system 200 of FIG. 2 in accordance with one embodiment. The process begins when a remote host presents a physical cache line address PA[39:0] to interface 115 as part of the process of requesting access to a page (step 405). Interface 115 reads the cache line at the requested address of volatile memory 105 and compares the tag field T with a subset of the bits from the requested address. If the tag matches, as determined in decision 415, the cache line read from volatile memory 105 is the sought-after data; this condition is referred to as a "cache hit." Responsive to a cache hit, per decision 420, if the access request is to read data, then interface 115 reads from the DRAM page (step 425) and presents the cache line to the requesting host. If the information is in the DRAM cache and the access request is to write data, then interface 115 writes the data into the addressed cache line (step 430) and sets the dirty bit associated with the written page address in the cache (step 435). The dirty bit marks the fact that the cache page 125 has been changed and so cannot be flushed from the cache unless the modified data and EDC bits are copied to a lower level in the memory hierarchy.

Returning to decision 415, if the requested page is not in the DRAM cache of volatile memory 105, then interface 115 copies the requested page from NVM 110 into the DRAM cache in preparation for the requested memory access. To do this, interface 115, using the contents of table 210, translates the requested physical address AP[39:0] into the corresponding NVM address AF[39:0] (step 440). Before copying the selected NVM page into the DRAM cache, interface 115 determines whether the cache page to be overwritten (the target page) is "dirty" by referencing a portion of tables 120 that interface 115 maintains for this purpose. With reference to cache line 130 of FIG. 1, dirty bits D of each cache line 130 in a given 4 KB page are logically ORed into a single dirty bit for the page. A 4 KB page is thus "dirty" if at least one of the constituent cache lines 130 is dirty.

If the target page is not dirty, per decision 445, then interface 115 checks to see whether the requested page and associated EDC bits await write-back in aggregation memory 205 (decision 446); if so, then the target page and associated EDC bits are copied from aggregation memory 205 to the DRAM cache (step 447). If the target page is not in aggregation memory 205 then the contents of the requested page and associated EDC bits are loaded from NVM 110 into the clean target page in the DRAM cache (step 448). DRAM access then proceeds as detailed previously.

Returning to decision 445, if the target DRAM page is dirty, interface 115 loads the dirty page and its EDC bits into aggregation memory 205 in the DRAM cache (step 449), resets the dirty bit (step 450), and loads the requested data page with associated EDC column from NVM 110 to the target page (step 448).

Per decision 455, if fewer than seven dirty pages have accumulated in aggregation memory 205, than interface 115 awaits the next dirty page (step 460). If seven dirty pages have accumulated, then interface 115 loads the aggregated dirty pages from aggregation memory 205 into the seven sequential page addresses in NVM 110 identified as the head page by register HeadF (step 465), loads the aggregated EDC for the dirty pages into the eight page address (step 470), marks the prior NVM addresses associated with the dirty pages as invalid in tables 120 (step 475), changes the physical-to-flash mapping associated with the dirty pages so that subsequent requests for the newly saved pages will access the updated NVM page (step 480), and advances head pointer HeadF to the next row of NVM pages in preparation for the next write to NVM 110 (step 485).

The number of NVM pages 145 marked as invalid will increase over time. A garbage collection process may therefore be performed from time to time to recover invalid pages for subsequent use. In one embodiment interface 115 compares the head and tail pointers of registers HeadF and TailF to sense when the number of erased NVM pages 145 drops below a threshold, in which case interface 115 copies each valid page in the eldest erase block 140 into pages 145 at head pointer HeadF before erasing the erase block and changing the contents of register TailF to point to the next candidate for an erase operation. In some embodiments interface 115 maintains a table in physical memory 108 that keeps track of the number of invalid pages in each erase block 130. When the number of erased pages falls below some threshold, an erase block with many or the most invalid pages may be erased.

Figure 5:
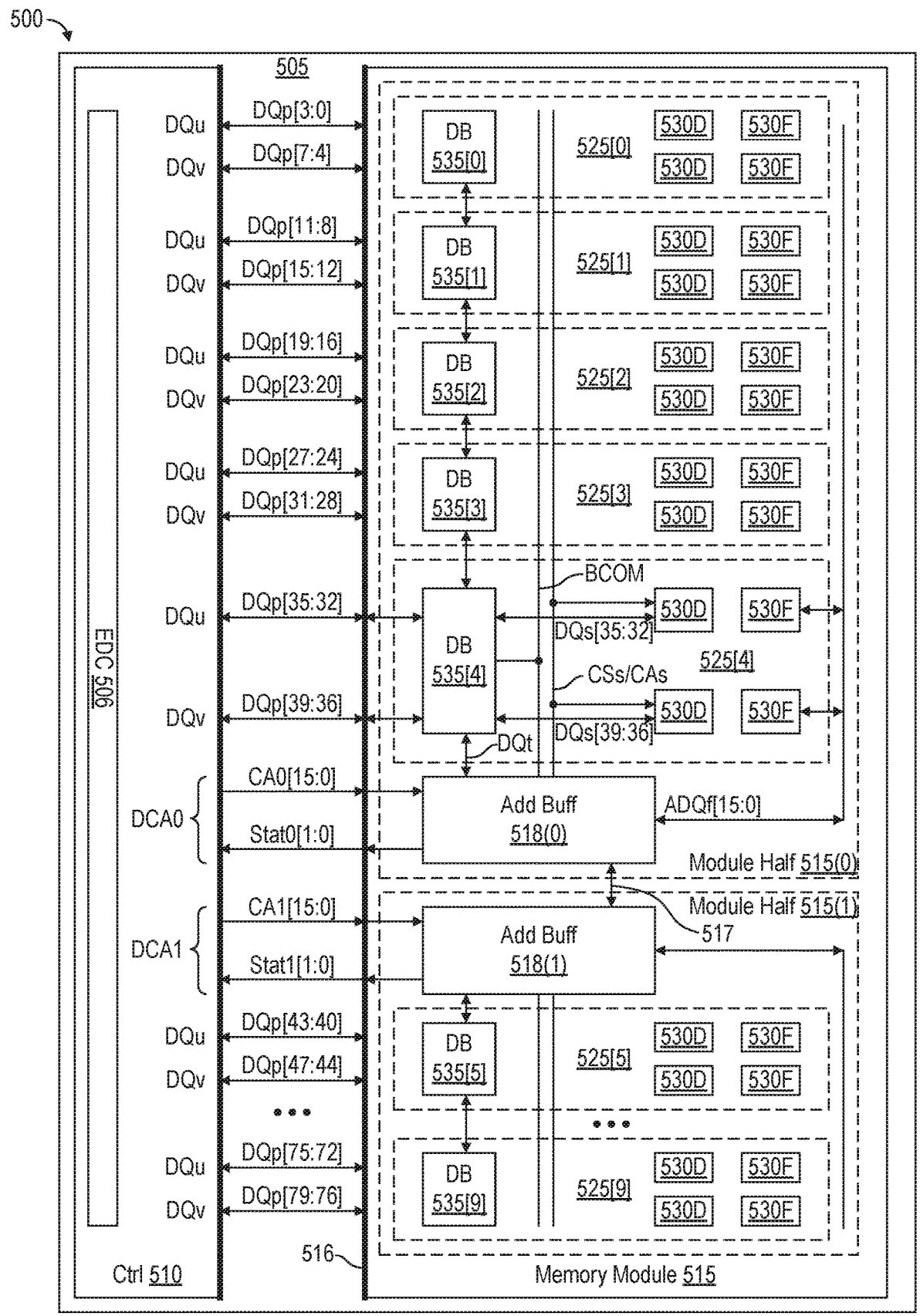
FIG. 5 depicts a hybrid memory module 500 in which DRAM components cache a subset of data stored in a larger amount of NVM.

FIG. 5 depicts a hybrid memory module 500 in which DRAM components cache a subset of data stored in a larger amount of NVM. As in the example of FIG. 1, the DRAM components are divided into pages that store both data and associated EDC bits that are collectively too numerous to store in a single page of NVM. Module 500 uses a page-aggregation scheme to manage write backs to NVM.

A motherboard 505 supports a memory controller 510 that communicates with a hybrid memory module 515 via twenty pairs of nibble-wide (four-bit, or x4) primary data ports DQu/DQv and two primary command-and-address (CA) ports DCA0 and DCA1. EDC circuitry 506 on a memory controller 510 computes EDC bits for write data and employs EDC bits associated with read data for error detection and correction. Memory module 515 is logically divided into two module halves 515(0) and 515(1) that can be controlled separately or together to communicate either forty-bit or eighty-bit data over a module connector 516. Halves 515(0) and 515(1) are identical for purposes of this disclosure; the following discussion focusses on low-order module half 515(0). Links 517 between module halves 515(0) and 515(1) allow both to respond to the same commands in the eighty-bit mode.

Module half 515(0) includes a local address buffer 518(0), sometimes referred to as a register or registering clock driver (RCD), or a module controller. Among other functions address buffer 518(0) supports page aggregation and write-back processes of the type detailed above. Address buffer 518(0) can be a single integrated-circuit (IC) component that manages five memory slices 525[4:0] at the direction of external controller 510.

Each slice 525[4:0] includes two NVM components 530F, two DRAM components 530D, and a data-buffer (DB) component 535. Memory components 530F are NAND flash components, but other types of nonvolatile memory can be used. Wear leveling as detailed herein can improve the endurance of NOR-flash and phase-change memories for example.

DRAM components 530D collectively have e.g. one one-sixteenth (1/16th) the storage capacity of flash components 530F. Among other tasks, each DB component 535 works with address buffer 518(0) to manage the flow of data between DRAM components 530D of the same slice and flash components 530F from the same or different slices. The following discussion focuses on memory slice 525[4], the slice in module half 515(0) closest to address buffer 518(0). The remaining slices 525[3:0] are essentially identical. DRAM and flash memories can be arranged differently in other embodiments. Where DRAM components 530D are organized in slices, for example, it could be that flash components 530F are separate from all or a subset of these slices. For example, only every other slice with one or more DRAM component might also include NVM.

Address buffer 518(0) receives commands from external controller 510 via links CA0[15:0] and returns status information via links Stat0[1:0]. Address buffer 518(0) also controls: DB components 535[4:0] via a local communication bus BCOM; DRAM components 530D via a DRAM control bus CSs/CAs (for chip-select/command, and address); and flash components 530F via a flash data and control bus ADQf. In one embodiment, bus ADQf conforms to an interface specification known as ONFI, for "Open NAND Flash Interface." Other embodiments can use different interfaces and different types of volatile and nonvolatile memory.

Remaining focused on slice 525[4], DB component 535[4] communicates with controller 510 via eight primary data links DQp[39:32] and with DRAM components 530D via a corresponding eight secondary data links DQs[39:32]. Read and write memory accesses are accomplished in sixteen-bit bursts, so DB component 535[4] communicates 528 bits (4×2×16 b=128 b) for each memory access, and the five slices 525[4:0] of module half 515(0) communicate a cumulative 640 bits (5×128 b=640 b) with external controller 510. Using ten-bit bytes, module half 515(0) thus exhibits an access granularity of sixty-four bytes (64 B). DRAM components 530D are collectively employed as cache memory, and the data sets transferred between DRAM components 530D and either controller 510 or flash components 530F are 80 B cache lines 130 of the type introduced in FIG. 1, which includes 64 B of data, 8 B of EDC bits, and 8 B for parity and cache-related bits.

External controller 510 issues read commands that request information from specific addresses in flash components 530F. If requested data is cached in DRAM components 530D, then address buffer 518(0) manages the delivery of that cache line from a rank of ten DRAM components 530D via five DB components 535[4:0]. In this context, a "rank" refers to a set of components that address buffer 518(0) accesses (read or write) responsive to a host-side memory request. Each DRAM component 530D has a data width of four bits, so module half 515(0) has a rank width of forty bits.

If the requested data is not in cache—a so-called cache miss—address buffer 518(0) reads the requested data from one or more of flash components 530F via local bus ADQf and distributes the requested cache line evenly across all ten DRAM components 530D of module half 515(0). In a wide mode, module 515 supports ranks of twenty DRAM components 530D; links 517 between address buffers 518(0) and 518(1) allow cache lines from one or more flash components 530F to be distributed across all twenty DRAM components 530D. A local bidirectional or paired unidirectional daisy-chain data bus DQt provides point-to-point connections between address buffer 518(0) and each slice 525[4:0]. Caching a subset of each cache line in each DRAM component 530D supports parallel, high-speed read and write access for host controller 510. Storing complete flash cache lines in individual flash components 530F facilitates fast and efficient cache write-back and garbage-collection processes.

A memory module thus includes a cache of relatively fast, durable, and expensive dynamic, random-access memory (DRAM) in service of a larger amount of relatively slow, wear-sensitive, and inexpensive flash memory. A local controller on the memory module manages communication between the DRAM cache and flash memory to accommodate disparate access granularities, reduce the requisite number of memory transactions, and minimize the flow of data external to flash memory components. The memory module thus combines the nonvolatility and reduced per-bit price of flash memory with the speed and durability of DRAM.

Figure 6:
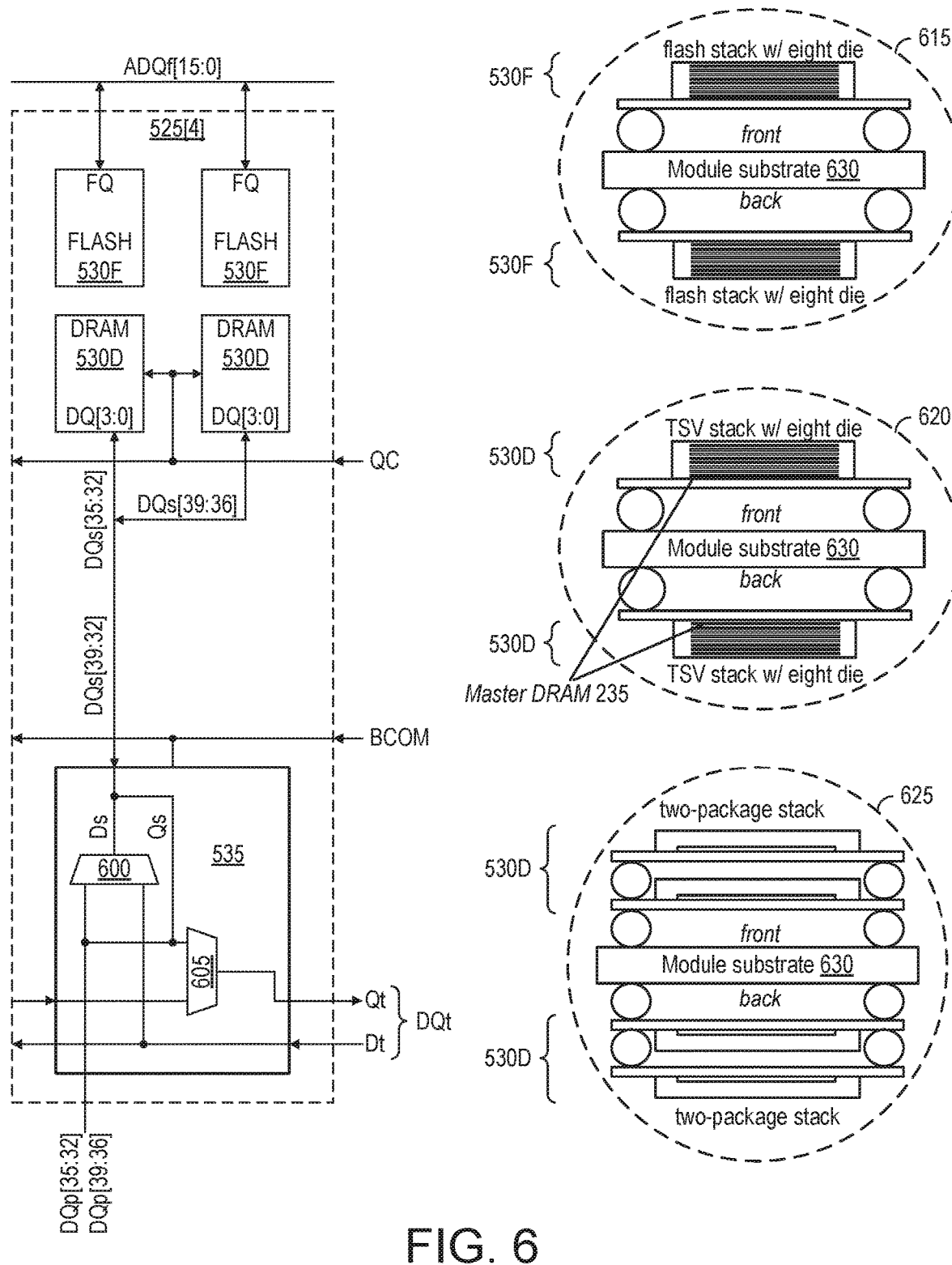
FIG. 6 depicts memory slice 525[4] of FIG. 5 in accordance with one embodiment.

FIG. 6 depicts memory slice 525[4] of FIG. 5 in accordance with one embodiment. Each of DRAM components 530D includes a DRAM-component interface DQ[3:0] supporting a four-bit data width (the "volatile data width") connected to data-buffer component 535 via a respective one of the two secondary data link groups DQs[35:32] and DQs[39:36]. Each of flash components 530F includes a flash-component interface FQ connected to module controller 518(0) via multi-drop bus ADQf[15:0]. Component interfaces FQ and bus ADQf each support a sixteen-bit data width (the "nonvolatile data width"). Steering logic 600 and 605 allow DRAM components 530D to communicate data with controller 510, via primary data links DQp[39:32], or with flash components 530F via local bus DQt. Steering logic 605 and links DQt through DB component 535 additionally allow slice 525[4] to communicate data between module controller 518(0) and neighboring slices 525[3:0]. This functionality is detailed below in connection with FIG. 3.

FIG. 6 additionally shows a packaging option 615 for flash components 530F and alternative packaging options 620 and 625 for DRAM components 530D. Flash packaging option 615 includes two stacks of eight flash devices, or "dies," interconnected by e.g. through-silicon vias (TSVs). Flash components 530F are on either side of module substrate 630 in this example. DRAM packaging option 620 includes two stacks of eight DRAM dies interconnected by e.g. TSVs. Module controller 518(0) thus selects a rank of DRAM dies, one from each DRAM component 530D, for each memory access. Each DRAM stack includes a master die 635 with data-buffer logic. In packaging option 625, DRAM components 530D are two-package stacks, one package on either side of module substrate 630. DRAM components 530D serve as cache storage for up to e.g. one sixteenth of the storage space afforded by flash components 530F. Other alternative arrangements with the same or different numbers of DRAM or nonvolatile memory dies or packages can also be used. Memory systems of the type detailed herein can have numbers of memory components and dies that are powers of two.

Figure 7:
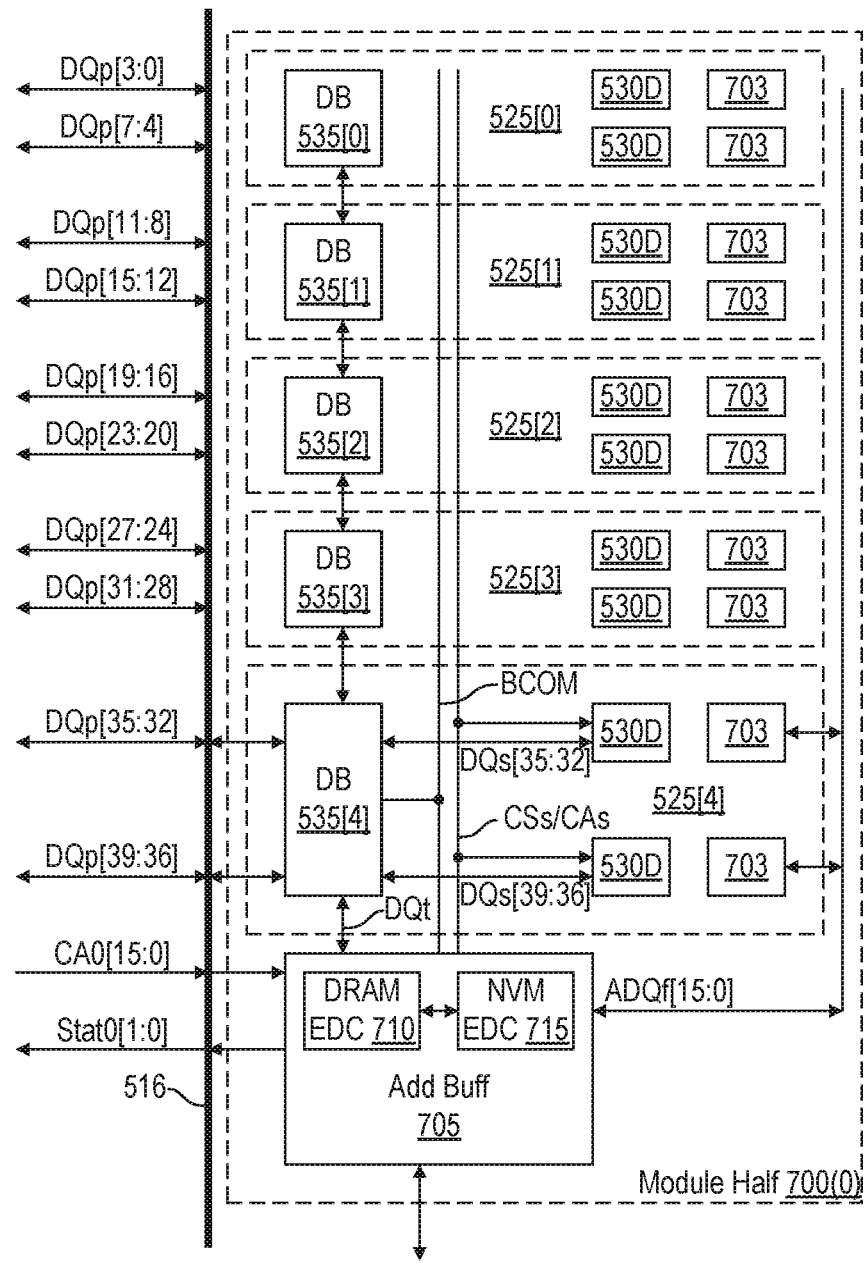
FIG. 7 illustrates a module half 700(0) in accordance with another embodiment.

FIG. 7 illustrates a module half 700(0) in accordance with another embodiment. Module half 700(0) is similar to module half 515(0) of FIG. 5, with like-identified elements being the same or similar. Different from examples noted previously, module half 700 includes NVM components 703 that include storage for EDC bits. This storage is not adequate for the more robust EDC employed for DRAM components 530D. In one embodiment, for example, NVM component 703 supports 9/8 EDC storage.

Module half 700 includes an address buffer 705 that manages EDC differently than those embodiments illustrated in connection with earlier figures. DRAM EDC circuitry 710 employs EDC bits from data read from DRAM components 530D to detect and correct errors and generates EDC bit for data written from NVM 703 to DRAM. NVM EDC circuitry 715 supports a 9/8 EDC code that employs EDC bits from data read from NVM components 703 to detect and correct NVM errors and generates EDC bit for data written to NVM 703.

Figure 8:
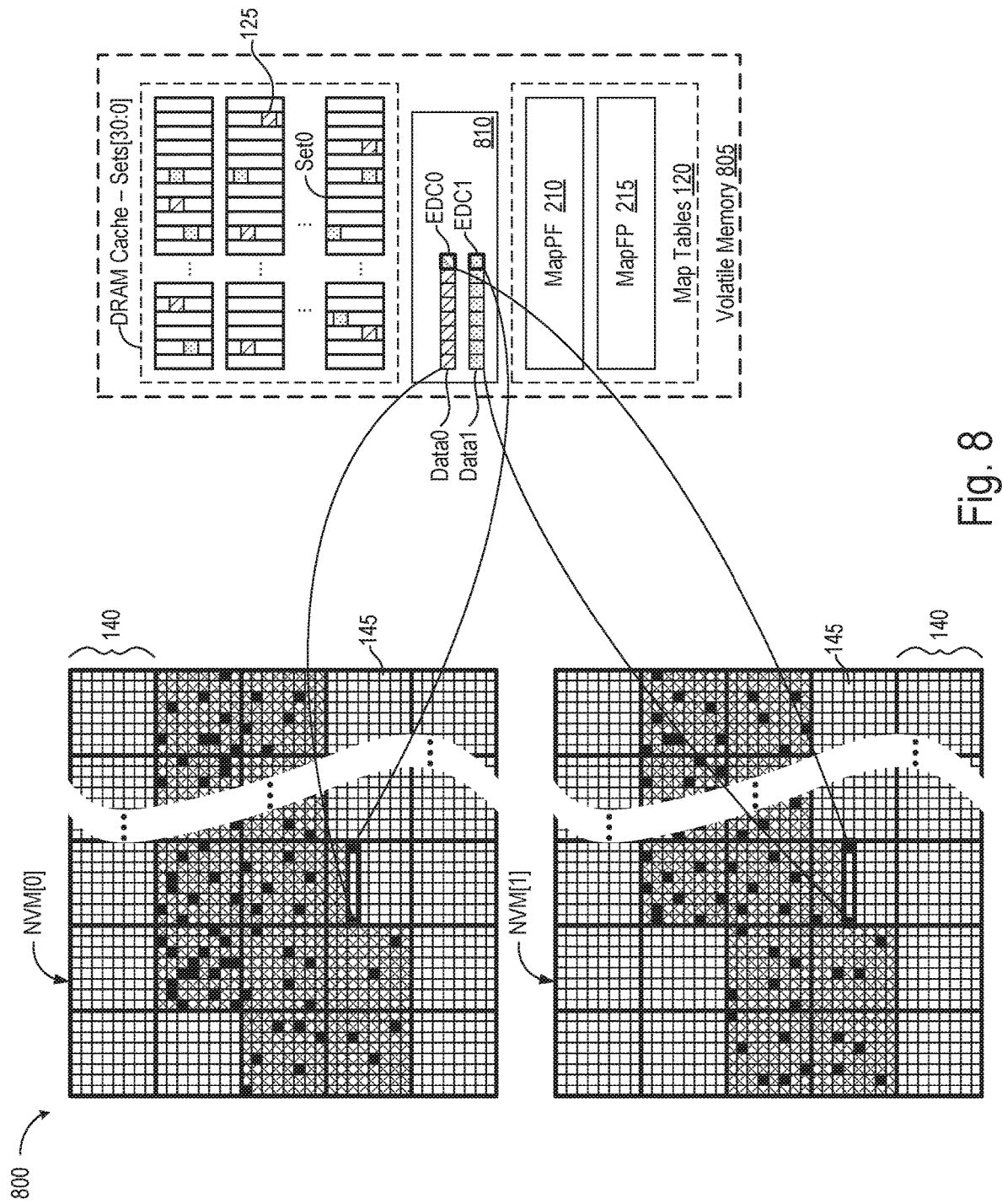
FIG. 8 depicts a memory system 800 with non-volatile memory divided across two devices NVM 110[0] and 110[1].

FIG. 8 depicts a memory system 800 similar to systems 100 and 200 of FIGS. 1 and 2, with like-identified elements being the same or similar. Nonvolatile memory is divided across two NVM devices NVM[1:0], each of which includes groups of nonvolatile erase blocks 140 and NVM pages 145. A volatile memory 805 includes thirty-one sets Set[30:0] of DRAM cache, address map tables 120, and write-back aggregation memory 810. Tables 120 includes a mapPF table 210 that maintains a mapping between physical addresses and NVM addresses for NVM pages 145; and a MapFP/ValidF table 215 that maintains a mapping between NVM addresses and physical addresses and identifies valid and invalid page entries in NVM[1:0].

Aggregation memory 810 stores two sets of data Data0 and Data1 and respective sets of EDC bits EDC0 and EDC1. System 800 aggregates two rows of seven dirty pages in memory 810 before initiating a write to NVM 110. Two rows of eight NVM pages 145 are therefore updated together rather than separately to dramatically reduce the requisite number of NVM writes and consequently prolong service life. In a crisscross fashion, the page of EDC bits EDC0 (EDC1) is written to the same row of pages as the unrelated seven pages of data Data1 (Data0). During a read to non-volatile memory, the requested data page and associated EDC page can thus be read simultaneously from both devices NVM[1:0] using a single access, rather than successively from the same device, for improved speed performance. Each of devices NVM[1:0] includes a data structure snaking through the available pages in this example. Other embodiments can support more or fewer data structures than there are memory devices.

While the subject matter has been described in connection with specific embodiments, other embodiments are also envisioned. For example, some systems employ error-detection syndromes and circuitry to report errors in lieu of more complex EDC support capable of error correction. Other variations will be evident to those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A method of accessing a data page and error-detection syndromes corresponding to the data page in an erase block of a non-volatile memory (NVM) responsive to a command to a physical address specifying a physical page using physical-page-address bits, the erase block comprising an array of NVM pages, the method comprising:
    writing the data page into a first of the NVM pages at a first NVM address in the erase block of the NVM;
    writing the error-detection syndromes into a second of the NVM pages at a second NVM address in the erase block of the NVM; and
    mapping the physical-page-address bits to low-order bits of the second NVM address.

2. The method of claim 1, further comprising mapping the physical-page-address bits to high-order bits of the first NVM address.

3. The method of claim 1, wherein the low-order bits of the second NVM address comprise least-significant bits of the second NVM address.

4. The method of claim 1, the low-order bits specifying a subset of the NVM within the second of the NVM pages in the erase block of the NVM.

5. The method of claim 1, wherein the NVM comprises NVM devices that number a power of two.

6. The method of claim 1, further comprising mapping the physical-page-address bits to a sub-page address of the second of the NVM pages in the erase block of the NVM.

7. A method of accessing a data page and error-detection syndromes corresponding to the data page in an erase block of a non-volatile memory (NVM) responsive to a command to a physical address specifying a physical page using physical-page-address bits and column-address bits, the erase block comprising an array of NVM pages, the method comprising:
    writing the data page into a first of the NVM pages at a first NVM address in the erase block of the NVM;
    writing the error-detection syndromes into a second of the NVM pages at a second NVM address in the erase block of the NVM; and
    selecting between the first of the NVM pages and the second of the NVM pages responsive to the column-address bits.

8. The method of claim 7, wherein the array of NVM pages includes rows of NVM pages, high-order bits of the physical address specifying one of the rows of NVM pages.

9. The method of claim 8, wherein the first NVM page and the second NVM page are adjacent pages in the specified one of the rows of NVM pages.

10. The method of claim 8, wherein the first NVM page and the second NVM page are separated by at least a third one of the NVM pages.

11. The method of claim 7, wherein the array of NVM pages includes a power-of-two number of addressable ones of the NVM pages.

12. A method of accessing data pages and, for each data page, a corresponding error-detection syndrome in a row of non-volatile memory (NVM) pages, the method comprising:
    writing each data page to a respective NVM page of the row of NVM pages; and
    for each data page written to the row of NVM pages, writing the error-detection syndrome corresponding to the data page in one of the NVM pages of the row of NVM pages, the one of the NVM pages storing the error-detection syndromes from each of the data pages written to the row of NVM pages.

13. The method of claim 12, wherein the NVM pages of the row of NVM pages number eight.

14. The method of claim 13, further comprising storing the error-detection syndromes in ⅞ of the one of the NVM pages.

15. The method of claim 14, further comprising storing the error-detection syndromes in lower-order column addresses of the one of the NVM pages.

16. The method of claim 12, wherein the accessing each data page is responsive to a command to a physical address of a NVM that includes the row of NVM pages, wherein the NVM comprises a number of NVM devices that is not a power of two.

17. The method of claim 16, further comprising mapping device-address bits of the physical address to most-significant bits of a NVM address of the NVM.

18. The method of claim 17, further comprising mapping page-address bits of the physical address to next-most-significant bits of the NVM address of the NVM.

19. The method of claim 18, further comprising combining the most-significant bits and the next-most-significant bits of the NVM address of the NVM to form a contiguous address space from a non-contiguous address space.

* * * * *